(12) United States Patent
Esser et al.

(10) Patent No.: US 8,931,986 B2
(45) Date of Patent: Jan. 13, 2015

(54) END STOP DEVICE, CARGO LOADING SYSTEM AND AIRCRAFT

(71) Applicant: Airbus Operations GmbH, Hamburg (DE)

(72) Inventors: Markus Esser, Bremen (DE); André Koehler, Bremen (DE); Ali Lohmann, Sottrum (DE); Joerg Pump, Hamburg (DE); Soenke Hager, Bremen (DE); Edward Elliot-May, Bremen (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 14/295,568

(22) Filed: Jun. 4, 2014

(65) Prior Publication Data
US 2014/0369781 A1    Dec. 18, 2014

(30) Foreign Application Priority Data

Jun. 17, 2013 (EP) .................................... 13172262

(51) Int. Cl.
*B60P 7/08* (2006.01)
*B64D 9/00* (2006.01)
*B60P 7/13* (2006.01)

(52) U.S. Cl.
CPC . *B64D 9/003* (2013.01); *B60P 7/13* (2013.01); *B60P 7/0807* (2013.01)
USPC ................ 410/94; 410/80; 410/102; 410/121

(58) Field of Classification Search
CPC ............ B60P 3/00; B60P 7/08; B60P 7/0807; B60P 7/0892; B60P 7/10; B60P 7/135; B64D 9/003
USPC ........... 410/94, 95, 102, 121, 153; 244/118.1, 244/137.1; 248/351
See application file for complete search history.

(56) References Cited

U.S. PATENT DOCUMENTS

| | | | |
|---|---|---|---|
| 3,995,562 A | 12/1976 | Nordstrom | |
| 7,435,043 B2 * | 10/2008 | Brekken et al. | ............ 410/69 |
| 2002/0131837 A1 | 9/2002 | Segura | |

FOREIGN PATENT DOCUMENTS

| | | |
|---|---|---|
| EP | 104 946 B1 | 4/1988 |
| EP | 921 072 A2 | 6/1999 |
| GB | 2 393 704 A | 4/2004 |

OTHER PUBLICATIONS

European Search Report (Nov. 21, 2013) (EP 13 172 262.1).

* cited by examiner

*Primary Examiner* — Stephen Gordon
(74) *Attorney, Agent, or Firm* — Lerner, David, Littenberg, Krumholz & Mentlik, LLP

(57) ABSTRACT

An end stop device for restraining an ULD from movement across a cargo deck surface of an aircraft includes a main body; and a mounting interface connected to the main body which is configured and arranged to attach the end stop device to the cargo deck by means of a corresponding tie down ring. Each mounting interface includes a tongue-like support plate which is partially protruding below a bottom side of the main body, at least one recess arranged in an area above the support plate, wherein side walls of the recess form a frame-like structure. and a bolt portion extending from the support plate into the recess and partially surrounded by the frame-like structure. The bolt portion is configured to engage the tie down ring in an operation mode where the end stop device is fixed to a tie down ring.

16 Claims, 8 Drawing Sheets

END STOP DEVICE, CARGO LOADING SYSTEM AND AIRCRAFT

TECHNICAL FIELD

The present invention relates to an end stop device for restraining an ULD from movement across a cargo deck surface of an aircraft. The present invention further relates to a cargo loading system and an aircraft.

TECHNICAL BACKGROUND

Air cargo is a vital component of many international logistic networks, essential to managing and controlling the flow of goods and other resources from the source of production to the marketplace. For air cargo transportation, as well passenger aircrafts and cargo aircrafts are used. A passenger aircraft comprises a lower deck for the air cargo which is available under the passenger's main deck. A pure cargo aircraft (also known as freight aircraft, freighter, airlifter, or cargo jet) is an aircraft that is designed or converted for the carriage of goods, rather than for passengers. In cargo aircrafts the main deck as well as the lower deck is used to carry cargo.

In modern cargo aircraft, cargo may be loaded through hinged cargo doors located in a side of the fuselage. For loading the cargo aircraft, specially designed ULDs (unit load devices) are used. ULDs are containers or pallets which are used to load luggage, freight and other products into the cargo compartment of an aircraft. It allows a large quantity of cargo to be bundled into a single unit. Since this leads to fewer units to load, it saves ground crew's time and effort.

During loading, the ULDs are transferred into the fuselage through the hinged cargo door and are then maneuvered on the cargo deck which for this purpose comprises a cargo loading system. The cargo loading system typically consists of a plurality of uni- or multi-directional transfer supports to ease the passage of ULDs over the surface of the cargo deck and into a final stowed position where it is secured to the cargo deck against movements by a number of either fixed or relocatable restraints. The function of these restraints, which hereinafter are referred to as end stop devices, is to prevent movement of the cargo during operation, i.e. during takeoff, flight and landing. During operation, the ULDs are resting against these end stop means.

There are multiple different types of end stop devices used in an aircraft depending on the type of the cargo loading system. Examples of such end stop devices are described in EP 921 072 A2 and EP 104 946 B1.

Typical end stop devices available in the art are movable and fixable along corresponding seat track profiles or rails which are provided in the cargo deck surface. During operation, the complete cargo within the cargo deck is typically secured by some few end stop devices which consequently have to take up very high forces and loads. Therefore, a specific requirement of end stop devices is their capability to take very high loads without breaking. If an end stop device breaks under stress e.g. due to heavy loads, the seat track profiles would rip apart. Since this scenario necessarily has to be avoided, commonly known end stop arrangements have a rather massive construction. Massive construction, however, means additional weight and costs.

BRIEF SUMMARY OF THE INVENTION

Accordingly, it is an idea of the present invention to provide a simple and at the same time fail-safe cargo restraint mechanism.

Accordingly it is provided:

An end stop device for restraining an ULD from movement across a cargo deck surface of an aircraft, the end stop device comprising: a main body; at least one mounting interface connected to the main body which is configured and arranged to attach the end stop device to the cargo deck by means of a corresponding tie down ring, each mounting interface comprising: a tongue-like support plate which is at least partially protruding below a bottom side of the main body; at least one recess arranged in an area above the support plate, wherein side walls of the recess forming a frame-like structure; a bolt portion extending from the support plate into the recess and at least partially surrounded by the frame-like structure, the bolt portion is configured to engage the tie down ring in an operation mode where the end stop device is fixed to a tie down ring.

A cargo loading system, comprising: a plurality of mounting areas, each of the mounting areas comprising an opening arranged in the cargo deck and extending below the cargo deck surface and a tie down ring which is irremovably mounted to a bottom surface of the opening; at least one end stop device according to the present invention, wherein each end stop device is designed and configured such that in an operation mode it is attachable to a corresponding mounting area by placing the support plate into an opening and by hinging the tie down ring arranged in this opening around the bolt portion at this support plate.

An aircraft, in particular a cargo aircraft, comprising at least one cargo deck, wherein each cargo deck comprises at least one cargo loading system according to the present invention.

It is a finding of the present invention that end stop devices available in the art and their connecting interface are having a massive construction and are consequently rather heavy in order to prevent that they break due to heavy loads. The idea underlying the present invention is now to provide a tie down ring based and more or less block-shaped end stop device for use in an aircraft. The end stop device does not use hooks (which might break) or seat track profiles which are complex and heavy and which are further not capable to take such high loads. The connection to the cargo deck (i.e. the cargo floor) is realised by employing tie down rings in such a way that the ring portion of a tie down ring is laid over an included half-moon shaped recess and secured by locking pins. The advantages of these end stop devices are as follows:

By using simple tie down rings, on the one hand the end stop devices and the connecting process can be easily handled. On the other hand, the end stop device according to the present invention is much more weight efficient (with the same tensile strength) than known solutions since no massive and heavy connecting elements are needed any more.

Further, no heavy seat track connections, track channels, rails and the like are needed. Instead the connection to the interior surface of the cargo deck is realized by using tie down rings arranged in a simple opening within the cargo deck floor. It is a finding of the present invention that these tie down ring based connections are more resilient than e.g. seat track connections.

According to an arrangement the frame-like structure within the recess has a half-moon shape in the plane of the main body surface. Additionally or alternatively, the bolt portion has also a half-moon shape which is weight efficient. The shape of the bolt portion should be preferably such that the inner surface of the ring portion of a tie down ring fits gapless to the outer surface of the bolt portion. Or in other words, the surface curvatures of the bolt portion and the ring portion of a tie down ring should correspond to each other.

According to an embodiment the bolt portion has a hollow cylindrical shape which is weight efficient without reducing the stability. In a further embodiment the bolt portion and the support plate are connected such to form a first through hole in the support plate.

According to an embodiment the bolt portion is integrally formed with on the support plate. This provides highly reliable connections between the bolt portion and the support plate. The connection between the bolt portion and the support plate may be a welded connection which is highly durable and provides high tensile strength. The bolt portion is in particular laser beam welded on the support plate which results in high quality welds. Additionally, laser beam welding techniques may be easily automated with robotic machinery. In a most preferred embodiment, the bolt portion (as well as the recess and the support plate) are produced by milling from a solid block which later on forms the main body.

In a further embodiment the end stop device comprises two mounting interfaces which are arranged at opposite front faces of the main body and which are preferably identical shaped. This way the device can be used and installed by simply turning them around 180°.

According to a further arrangement the support plate is integrally connected with the frame-like structure and/or the main body. The support plate is extending tongue-like downwards from the bottom side of the main body such that in an installed condition the support plate is protruding into an opening of a mounting area.

In a typical arrangement the end stop device comprises at least one stop plate which is connected to and arranged at a top side of the main body such to prevent movements of an ULD when resting on an upper surface of the main body. This stop plate is extending upwardly from the main body. The stop plate may be extending essentially vertical up from the main body. In order to provide a reliable connection the stop plate is welded to the main body or connected with bolts, screws or quick release pins to the main body. In an alternative embodiment the stop plate is connected to a connecting interface of the main body using screws, bolts or the like.

In an arrangement, the stop plate comprises two stop surfaces which are arranged on opposite front faces of the stop plate. This way the end stop device can be installed in two directions by turning it around 180° where an ULD is held by the other stop surface. This offers a higher flexibility when using different types and/or sizes of ULDs.

In a further embodiment, a short distance of a first stop plate surface to a short end of the end stop device is shorter than a long distance of a second stop plate surface to a long end of the end stop device. This means that the stop plate is asymmetrically mounted on the main plate, i.e. in the side view the stop plate is offset laterally with respect to the center of the main body. With this configuration, the end stop device can be installed in two directions by turning it around 180° which results in different distances to an ULD. The benefit of this kind of arrangement is that a smaller grid is realized. The short distance may be about one third of the long distance. However, it may also be possible that the short distance is about one half, one fourth or one fifth of the long distance.

In a further arrangement the end stop device comprises second through holes at opposite sides of the frame-like structure for inserting a locking pin. Two opposite through holes are always aligned to each other. The end stop device further comprises at least one removable locking pin which is configured to be inserted through the second through holes. In the operation mode a looking pin is inserted through both second through holes of the frame-like structure in order to clamp the tie down ring against the bolt portion and the support plate and thus to prevent movement of an engaged tie down ring. This locking pin does not need to take up heavy forces since it simply has to prevent that the tie down ring is detached from the bolt portion. This way, a very efficient and simple mechanism is provided to clamp the tie down ring against the bolt portion and the support plate. An unintentional or accidental release of the tie down ring from the bolt portion is thereby avoided. According to a further embodiment, the locking pin typically comprises a fast closing mechanism in order to simplify the locking and releasing process.

According to a typical cargo deck arrangement a plurality of end stop devices are attached to corresponding mounting areas. In a typical embodiment, 3 or 4 end stop devices are used simultaneously, depending on the width of the cargo compartment and applied forces thereon.

In a further embodiment the length of an end stop device corresponds to the distance of adjacent mounting areas. Alternatively, the length of an end stop device corresponds to the distance of adjacent tie down rings (or the corresponding openings). In particular, the length of an end stop device corresponds to the grid pattern of the tie down rings arranged along a line or within a rail in the cargo deck. For example, the end stop devices have a length of about 50 cm (20 inch) and the tie down rings are mounted with a grid of about 50 cm (20 inch) within openings in the cargo deck. This enables that the end stop member may be arranged and fixed exactly between two adjacent tie down rings. It is also possible that the length of an end stop device corresponds to multiple distances of adjacent tie down rings or vice versa.

According to another arrangement the tie down ring is made of steel or steel equivalent. The tie down ring may be mounted on a floor plate on a bottom surface of the opening. This kind of tie down ring connection is capable of performing reliably in various applications. In particular, these connections are highly durable, provide high tensile strength and are also capable of taking up high forces and loads.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Skilled artisans will appreciate that elements in the figures are illustrated for simplicity and clarity and have not necessarily drawn to scale. For example, the chosen elements are only used to help to improve the understanding of the functionality and the arrangements of these elements in various embodiments of the present invention. Also, common but well understood elements that are useful or necessary in a commercial feasible embodiment are mostly not depicted in order to facilitate a less abstracted view of these various embodiments of the present invention. It will further be appreciated that certain actions and/or steps in the described method may be described or depicted in a particular order of occurrences while those skilled in the art will understand that such specificity with respect to sequence is not actually required. It will also be understood that the terms and expressions used in the present specification have the ordinary meaning as it accorded to such terms and expressions with respect to their corresponding respective areas of inquiry and study except where specific meanings have otherwise be set forth herein.

In all figures of the drawings elements, features and signals which are the same or at least have the same functionality have been provided with the same reference symbols, unless explicitly stated otherwise.

DETAILED DESCRIPTION

Figure 1:
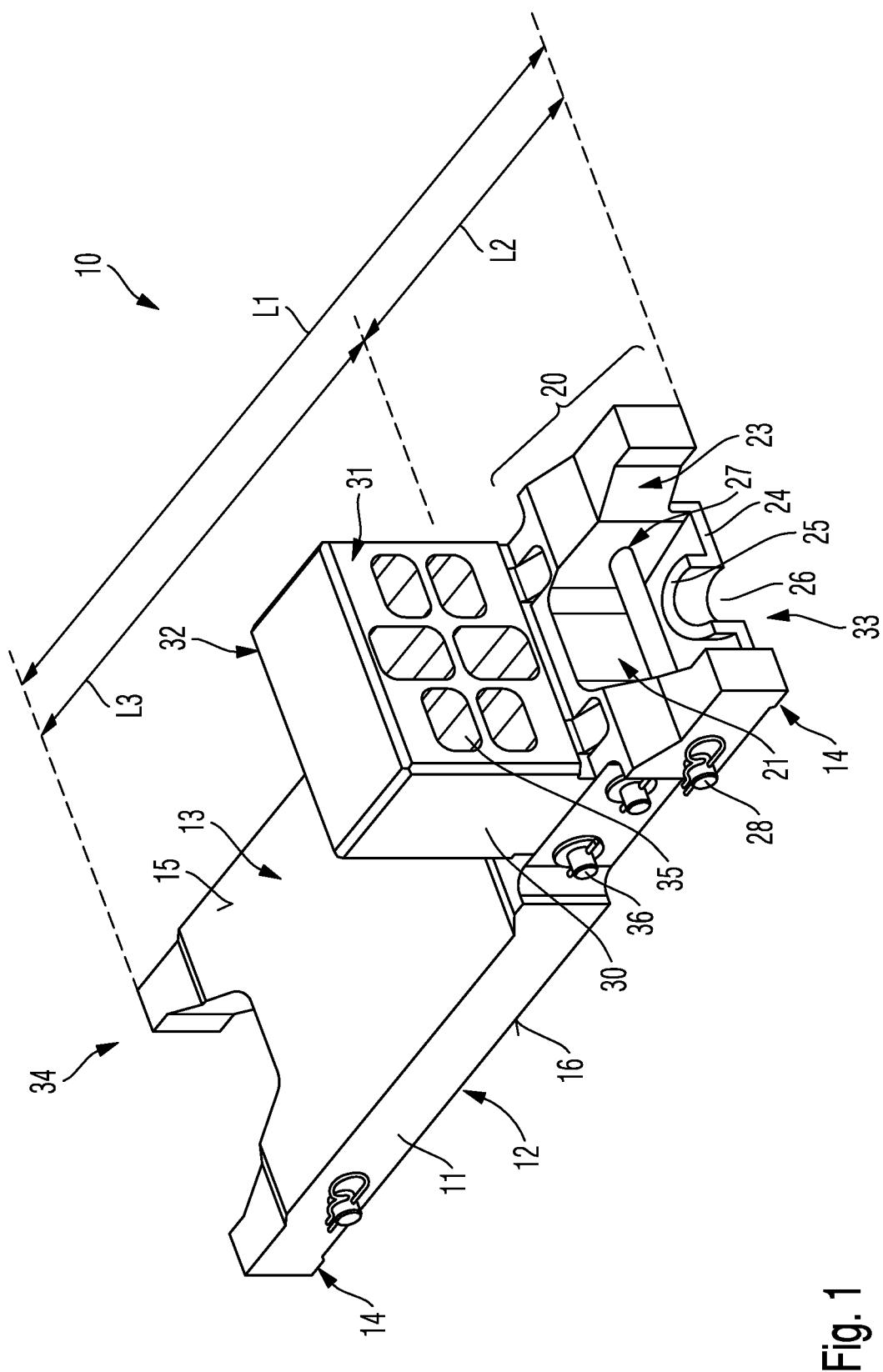
FIG. 1 a perspective view of a first embodiment of an end stop device according to the present invention.

FIG. 1 shows a perspective view of a first embodiment of an end stop device according to the present invention. In FIG. 1, reference symbol 10 denotes the end stop device. The end stop device 10 is designed for restraining an ULD (not shown in FIG. 1) from movement across a cargo deck surface of an aircraft. The end stop device 10 comprises a main body 11 which in the present embodiment has a block structure. The longitudinal alignment of the main body 11 defines the installation direction which is typically in the longitudinal direction of the fuselage of an aircraft.

The main body 11 comprises a bottom side 12 and a top side 13 opposite to the bottom side 12. Several contact areas 14 are provided at the bottom side 12 of the main body 11 for contacting the cargo deck surface. These contact areas 14 are distanced slightly from a bottom surface 16 of the main body 11, typically in the range of one or some few millimeters. During operation, when the end stop device 10 is installed with the cargo deck and when an ULD 54 is lying over an upper surface 15 and is pressed against the stop plate surface 31, the main body 11 is contacting the cargo deck surface 40 only via these contact areas 14. These contact areas 14 are then carrying the impact loads from an ULD when it touches the stop plate surface 31. The end stop device 10 comprises altogether four contact areas 14 which are placed on the four corner areas of the end step device 10. This way, it will be avoided that the end stop device 10 contacts the cargo deck surface with its bottom surface 16 superficially in order to prevent a binding of the end stop device 10.

An end stop device 10 shown in FIG. 1 further comprises two mounting interfaces 20. The two mounting interfaces 20 are arranged on opposite ends of the main body 11 and are integrally formed with the main body 11. With this configuration, the end stop device 10 can be installed in two directions by just turning it around 180°.

The purpose of the mounting interfaces 20 is to attach the end stop device 10 at a cargo deck of an aircraft (not shown in FIG. 1). For this purpose each mounting interface 20 comprises a support plate 24, a recess 21 and a bolt portion 25.

The support plate 24 has a tongue-like structure and is at least partially protruding below the bottom side 12 of the main body 11 (see also FIG. 4A). The support plate 24 is integrally formed with the main body 11.

The recess 21 is arranged in the area above the support plate 24. Side walls 23 of the recess 21 are forming a half-moon shaped frame-like structure. The side walls 23 of the recess 21 are integrally formed with the main body 11. Within these side walls 23 and at opposite sides of the frame-like structure 22 through holes 27 are provided. These through holes 27 are aligned to each other such that a single locking pin 28 can be inserted through both through holes 27 at the same time.

The bolt portion 25 extends half-cylindrical upwards from the support plate 24 and is integrally formed with the support plate 24, e.g. by laser beam welding. In the example of FIG. 1, the bolt portion 25 has a half-moon shape and is thus partially surrounded by the frame-like structure of the recess 21. The shape of the bolt portion 25 preferably corresponds to the one of a tie down ring (not shown in FIG. 1) such that in an operation mode the tie down ring is engageable with the bolt portion 25. The bolt portion 25 has a hollow cylindrical shape. In a weight efficient embodiment the bolt portion 25 forms together with the support plate 24 a further through hole 26.

The functionality of the above described mounting interface 20 will be explained in more detail with regard to FIG. 3A-3C.

The end stop device 10 further comprises a stop plate 30 which is connected to and arranged at the top side 13 of the main body 11. The purpose of the stop plate 30 is to prevent a movement of an ULD when resting on the upper surface 15. The stop plate 30 which is basically extending vertically from the top side 13 comprises two stop plate surfaces 31, 32 which are arranged on opposite front faces of the stop plate 30.

The end stop device 10 has an overall length L1.

In the embodiment of FIG. 1, the stop plate 30 is asymmetrically mounted on the main body 11. This means that in a side view the stop plate 30 is offset laterally with respect to the center of the main body 11. Thus, in this preferred embodiment, the distance of a right stop plate surface 31 to the right side end 33 (short end) of the end stop device 10 defines a short distance L2. The distance of a left stop plate surface 32 to the left side end 34 (long end) of the end stop device 10 defines a long distance L3. In this preferred embodiment of FIG. 1 the short distance L2 is much shorter than the long distance L3. With this configuration, the end stop device 10 can be installed in two directions by just turning it around 180°. The benefit of this kind of arrangement is that a smaller grid for fixing the ULDs is realized. In the shown embodiment, the short distance L2 is about one third of the long distance L3.

For example, the end stop device 10 has a length L1 of about 50 cm (20 inch) and the tie down rings (not shown in FIG. 1) are arranged in a 50 cm grid. This allows that the end stop device 10 can be arranged exactly between two adjacent tie down rings. If the end stop device 10 is then turned around 180°, with the asymmetric arrangement of the stop plate 30, then a 25 cm grid (10 inch) is realizable.

The stop plate 30 in FIG. 1 has an alveolar structure. In the present embodiment several through holes 35 are extending through the stop plate 30 from the first stop plate surface 31 to the second stop plate surface 32. This is weight efficient.

The stop plate 30 is connected to the main body via a connecting interface. In the embodiment in FIG. 1, the connecting interface is realized by means of connecting pins 36 through both, the main body 11 and the support plate 30. The connecting interface, however, may also be realized by screws, bolts, welds or the like.

Figure 2:
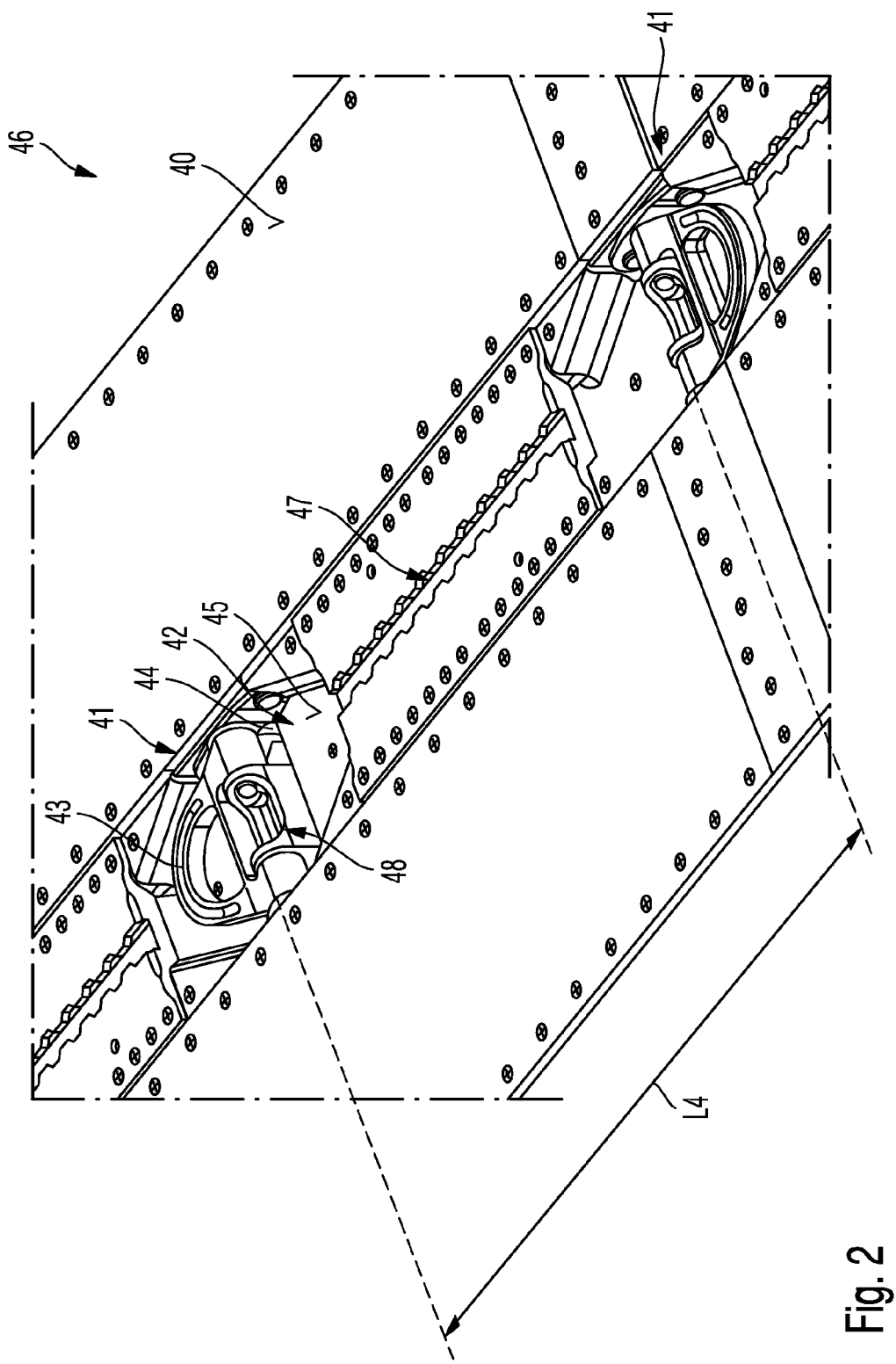
FIG. 2 a perspective view on a cargo deck surface and a mounting area arranged therein.

FIG. 2 shows a perspective view on the cargo deck surface. The cargo deck surface is denoted by reference symbol 40. The cargo deck surface 40 comprises a cargo loading system 46 having a plurality of mounting areas 41, wherein in the example shown in FIG. 2 only two of them are shown.

Each mounting areas 41 comprises an opening 42 and a tie down ring 43. The opening 42 is extending below the cargo deck surface 40. The tie down ring 43 is irremovably mounted via a bottom plate 44 at a bottom surface 45 of the opening 42. The tie down ring 43 is clapable back and forth.

Adjacent mounting areas 41 and thus adjacent tie down rings 43 are defining a mounting grid having a length L4. Preferably, the length L4 corresponds to the length L1 of an end stop device 10.

In the embodiment of FIG. 2, a seat track profile 47 is provided which is arranged between adjacent mounting areas 41. However, it should be noted that with the end stop devices 10 according to the present invention these seat track profiles 47 are basically not needed any more.

Figure 3A:
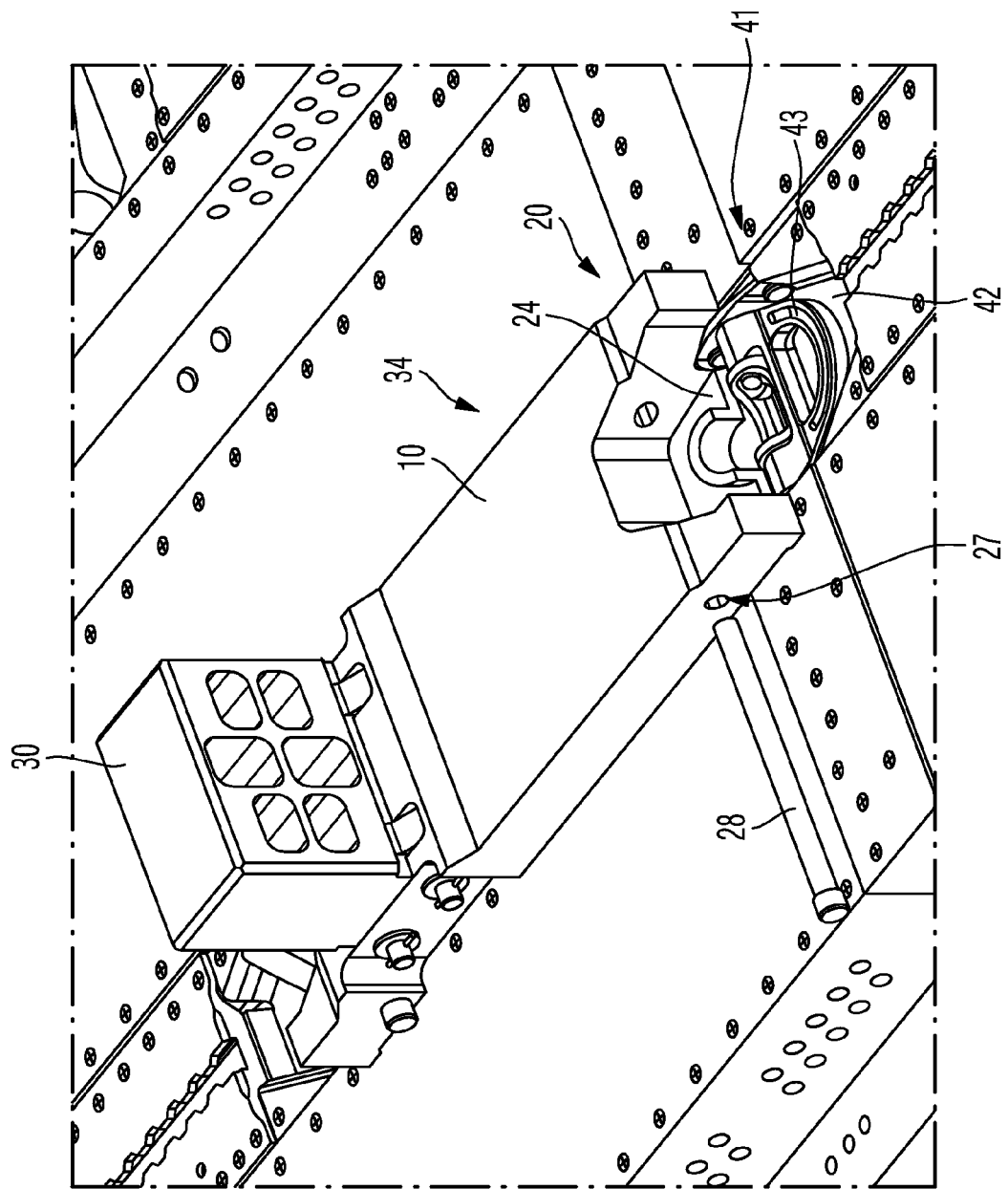
FIG. 3A-C perspective views on a cargo loading system according to the present invention in order to illustrate different installation situations of the end stop device of FIG. 1.
Figure 3B:
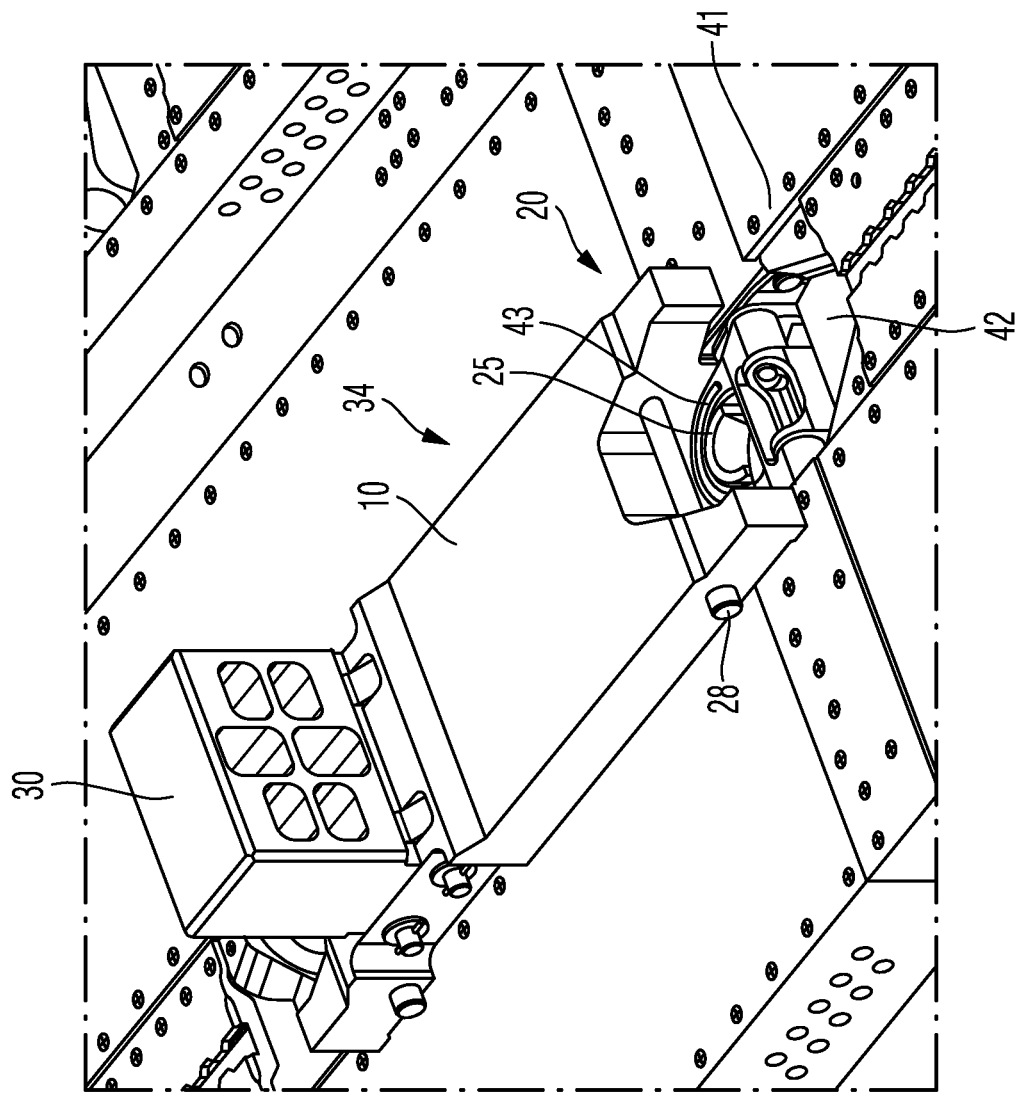
Figure 3C:
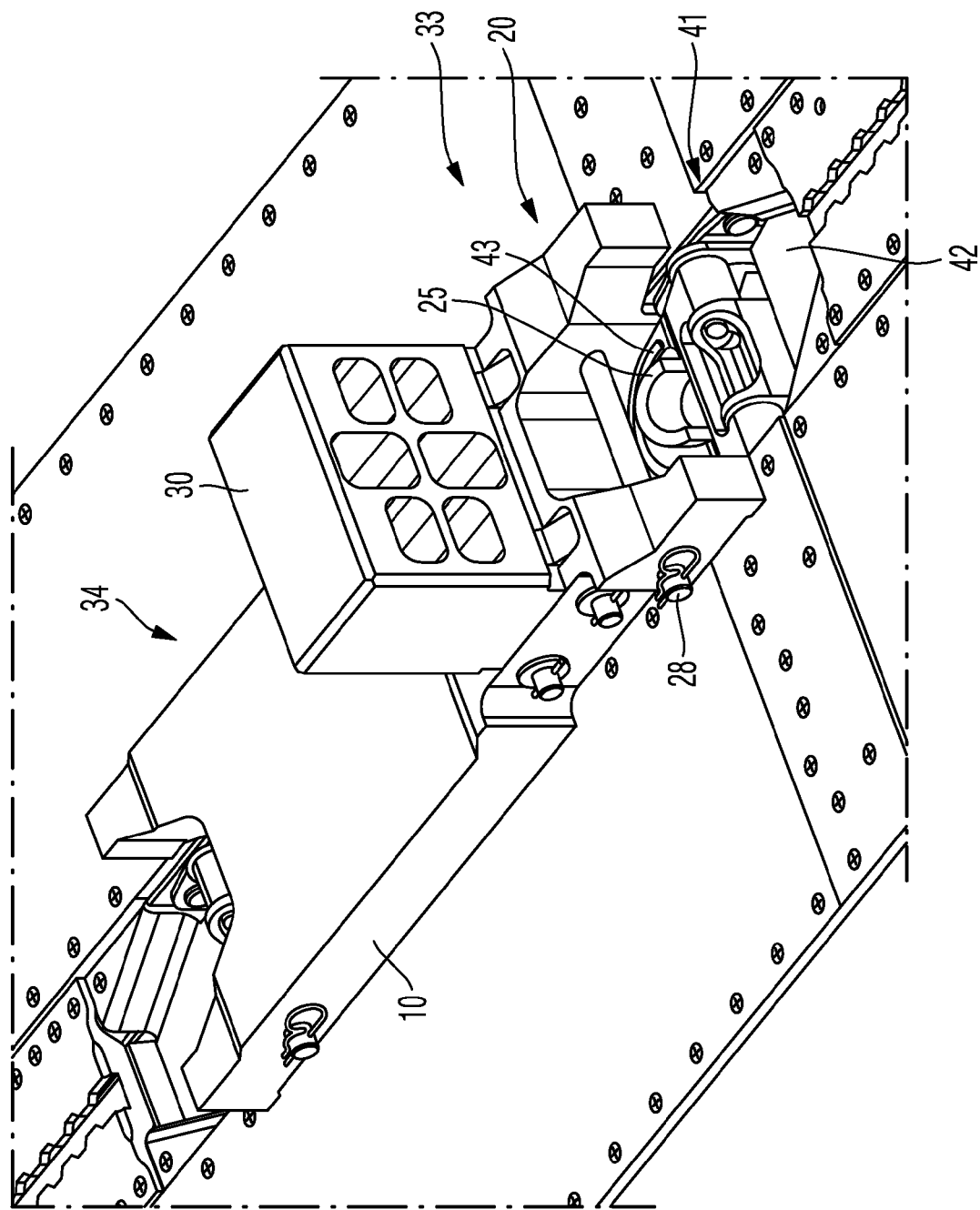

With reference now to FIG. 3A-C, different perspective views on a cargo loading system 46 are shown in order to illustrate different installation situations of the end stop device 10 of FIG. 1.

For the installation, the end stop device 10 is placed over a mounting area (see FIG. 3A). In this situation the mounting interface 20 is positioned right over the opening 42 of mounting area 40 such that the support plate 24 is extending in the interior of the opening 42 and a front face of the support plate 24 can be arranged tightly next a flat rear side 48 of the tie down ring 43.

FIG. 3B shows the next installation step, where the ring portion of the tie down ring 43 is clapped towards the recess of the mounting interface 20 of the end stop device 10. The tie down ring 43 is thereby hinged round the bolt portion 25 at the support plate 24. For securing the tensile strength connection between the bolt portion 25 and tie down ring 43 from disengagement, the locking pin 28 is inserted through both through holes 27 at the frame-like structure. This locking pin 28 is clamping the tie down ring 43 against the bolt portion 25 and the support plate 24.

FIG. 3B shows the connection of an end stop device 10 with a tie down ring 43 at its long end side 34. FIG. 3C shows another installation type of the end stop device 10, where the end stop device 10 is connected with the tie down ring 43 at its short end side 33.

Figure 4A:
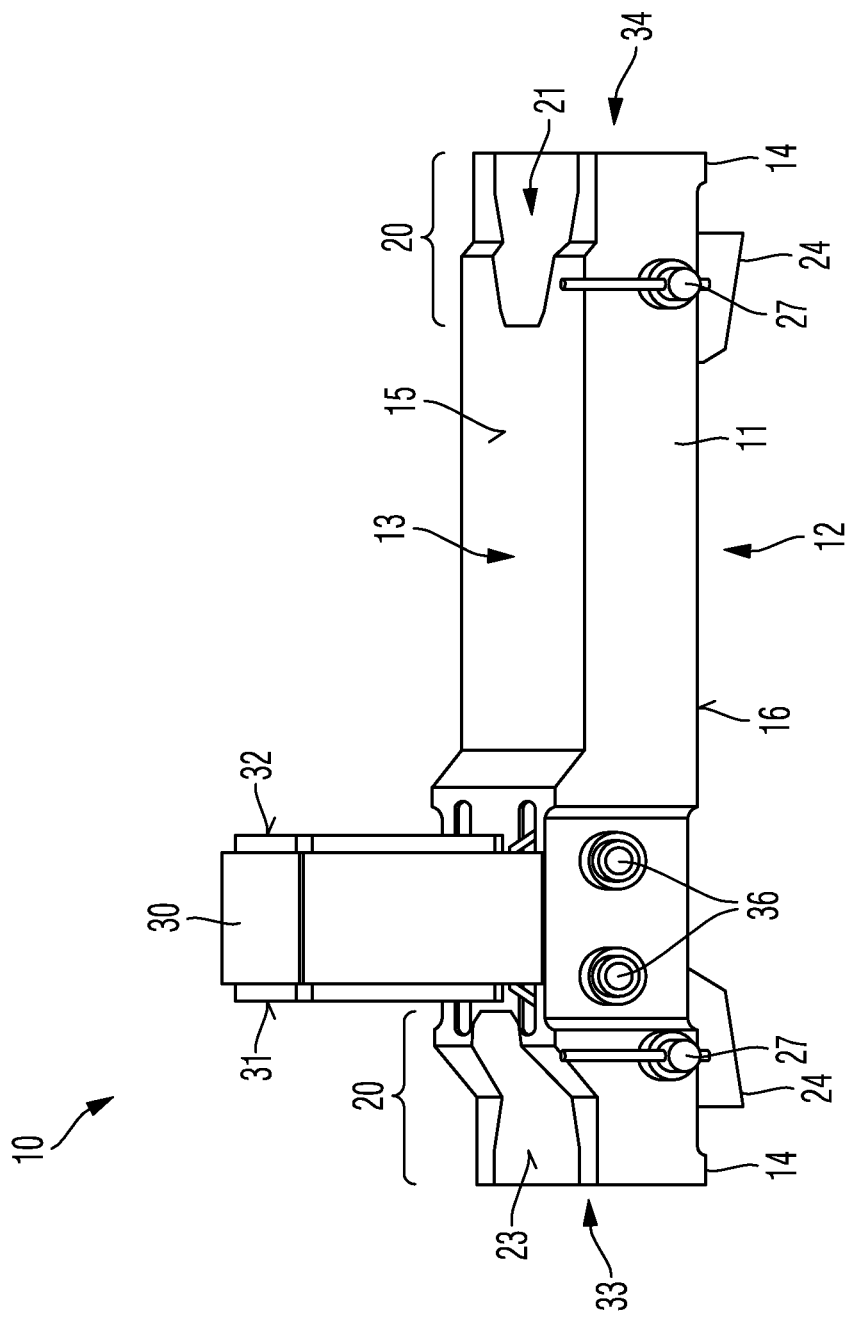
FIG. 4A-4C different view of the end stop device according to the present invention for illustrating a second embodiment.
Figure 4B:
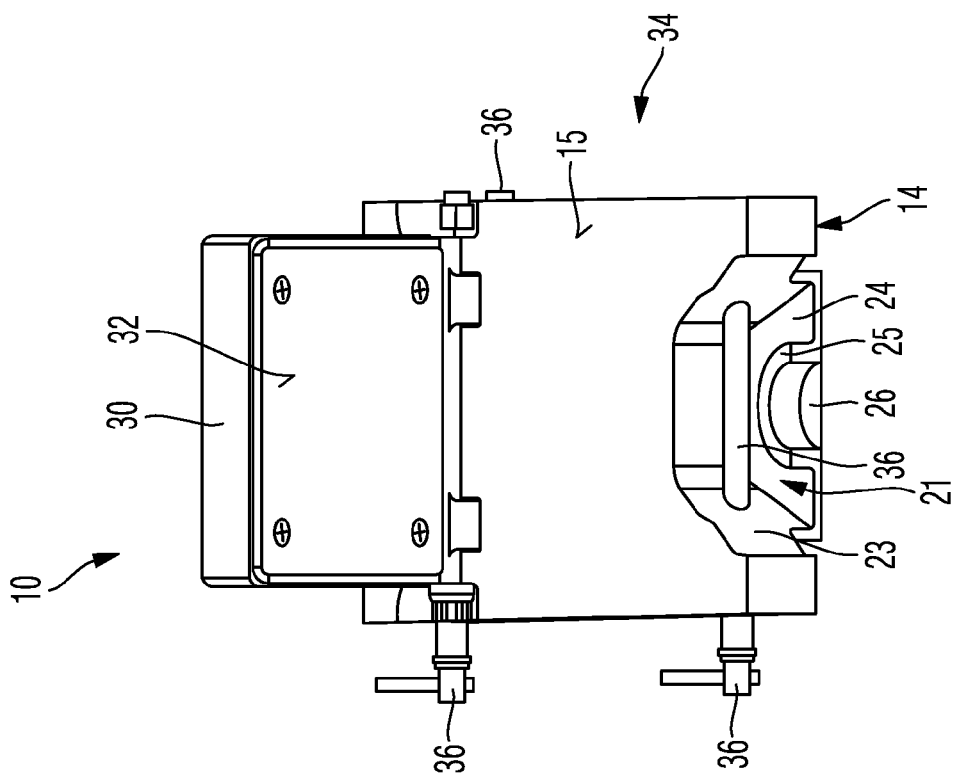
Figure 4C:
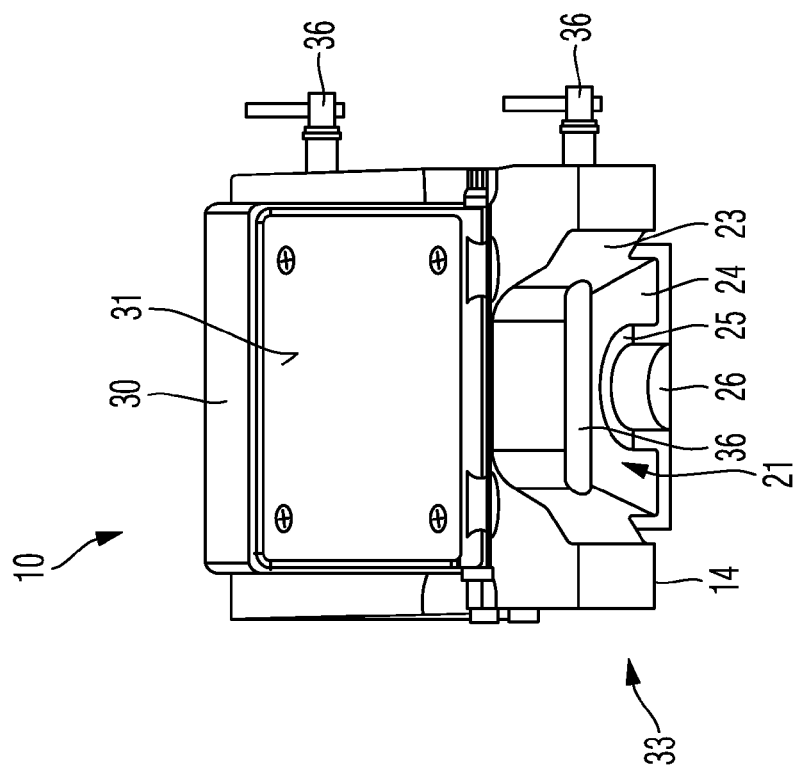

FIG. 4A shows a side view of the end stop device 10 according to the present invention for illustrating a second embodiment. FIG. 4B shows a front view of the long end 34 and FIG. 4C shows a front view of the short end 33 of the end stop device 10 of FIG. 4A. Different to the embodiment in FIG. 1, in this example the stop plate 30 has a massive construction and thus is configured to carry higher loads and forces.

Figure 5:
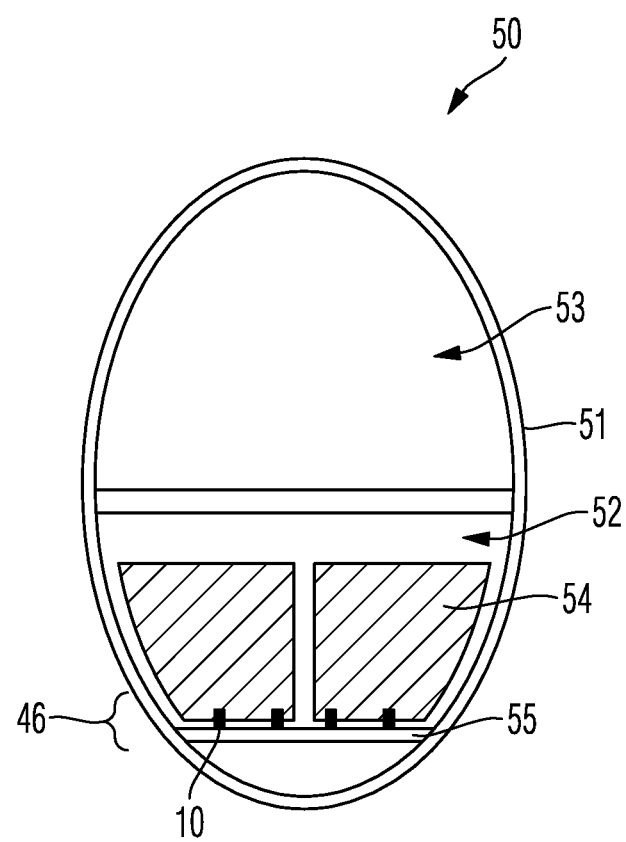
FIG. 5 an aircraft having a cargo loading system according to an embodiment of the present invention.

FIG. 5 shows an aircraft 50 according to the present invention. Particularly, FIG. 5 shows a cross section through the fuselage 51 of the aircraft 50 having a cargo loading system 46. The aircraft 50, which is in this embodiment a passenger aircraft 50, has a cargo deck 52 below the passenger deck 53. A cargo loading system 46 according to the present invention having several end stop devices 10 is installed on the floor 55 of the cargo deck 52 in order to fix ULDs 54 from movement over the cargo deck surface 40 and thus the freight compartment.

Although specific embodiments of the invention have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The end stop members and cargo loading system, respectively, according to the present invention is suitable for any aircraft, in particular (wide body) passenger aircraft having a cargo deck, pure cargo aircraft, but also helicopters. The end stop devices according to the present invention may also be used in other transportation means, such as railway cargo coaches, cargo ships, trucks and truck trailers and the like.

Further, the present invention is not restricted to the above described specific embodiment of a cargo decks.

Also, the materials and their properties are to be understood only exemplary and non-restricting. All figures are given for illustrations purposes and shall not restrict the invention thereto. It goes without saying that end stop member according to the present inventions also works with other common materials and dimensions. The same applies for the sort and type of tie down rings.

The invention claimed is:

1. An end stop device for restraining an ULD from movement across a cargo deck surface of an aircraft, the end stop device comprising:
    a main body,
    at least one mounting interface connected to the main body and configured and arranged to attach the end stop device to the cargo deck by a corresponding tie down ring, the at least one mounting interface comprising:
        a tongue-like support plate at least partially protruding below a bottom side of the main body,
        at least one recess arranged in an area above the support plate, wherein side walls of the recess form a frame-like structure,
        a bolt portion extending from the support plate into the recess and at least partially surrounded by the frame-like structure, the bolt portion configured to engage the corresponding tie down ring in an operation mode where the end stop device is fixed to the corresponding tie down ring.

2. The device according to claim 1, wherein at least one of the frame-like structure of the recess and the bolt portion has a half-moon shape.

3. The device according to claim 1, wherein the bolt portion has a hollow cylindrical shape and/or wherein the bolt portion forms a first through hole in the support plate.

4. The device according to claim 1, wherein the bolt portion is integrally formed with the support plate.

5. The device according to claim 1, wherein the at least one mounting interface comprises first and second mounting interfaces arranged at opposite ends of the main body.

6. The device according to claim 1, wherein the support plate is integrally connected with at least one of the frame-like structure of the recess and the main body, and wherein the support plate is extending tongue-like downwards below a bottom surface of the main body.

7. The device according to claim 1, comprising at least one stop plate connected to and arranged at a top side of the main body, wherein the at least one stop plate is configured to prevent movements of an ULD when resting on an upper surface of the main body.

8. The device according to claim 7, wherein the stop plate comprises first and second stop surfaces arranged on opposite front faces of the stop plate.

9. The device according to claim 7, wherein a short distance of a first stop plate surface to a short end of the end stop device is shorter than a long distance of a second stop plate surface to a long end of the end stop device.

10. The device according to claim 9, wherein the short distance is about one third of the long distance.

11. The device according to claim 1, comprising:
second through holes at opposite sides of the frame-like structure of the recess; and
at least one removable locking pin configured to be inserted through the second through holes, wherein the removable locking pin is configured to prevent a movement of the corresponding tie down ring during the operation mode.

12. A cargo loading system, comprising:
a plurality of mounting areas, each of the mounting areas comprising an opening arranged in a cargo deck and extending below a cargo deck surface and a respective tie down ring irremovably mounted to a bottom surface of each opening,
at least one end stop device comprising:
a main body,
at least one mounting interface connected to the main body and configured and arranged to attach the end stop device to the cargo deck by a corresponding one of the tie down rings, each mounting interface comprising:
a tongue-like support plate at least partially protruding below a bottom side of the main body,
at least one recess arranged in an area above the support plate, wherein side walls of the recess form a frame-like structure,
a bolt portion extending from the support plate into the recess and at least partially surrounded by the frame-like structure, the bolt portion is configured to engage one of the tie down rings in an operation mode where the end stop device is fixed to the one tie down ring,
wherein each end stop device is configured such that in an operational mode the stop device is attachable to a corresponding mounting area by placing the support plate into one of the openings and by hinging the one tie down ring arranged in the one opening around the bolt portion at the support plate.

13. The system according to claim 12, further comprising a looking pin inserted through second through holes to clamp the one tie down ring against the bolt portion and the support plate in the operational mode.

14. The system according to claim 12, further comprising a plurality of end stop devices attached to corresponding mounting areas.

15. The system according to claim 12, wherein a length of the end stop device corresponds to at least one of a distance of adjacent mounting areas and tie down rings.

16. An aircraft, comprising at least one cargo deck, wherein each cargo deck comprises at least one cargo loading system comprising:
a plurality of mounting areas, each of the mounting areas comprising an opening arranged in the cargo deck and extending below a cargo deck surface and a respective tie down ring irremovably mounted to a bottom surface of each opening,
at least one end stop device comprising:
a main body,
at least one mounting interface connected to the main body and configured and arranged to attach the end stop device to the cargo deck by a corresponding one of the tie down rings, each mounting interface comprising:
a tongue-like support plate at least partially protruding below a bottom side of the main body,
at least one recess arranged in an area above the support plate, wherein side walls of the recess form a frame-like structure,
a bolt portion extending from the support plate into the recess and at least partially surrounded by the frame-like structure, the bolt portion is configured to engage one of the tie down rings in an operation mode where the end stop device is fixed to the one tie down ring,
wherein each end stop device is configured such that in an operational mode the stop device is attachable to a corresponding mounting area by placing the support plate into one of the openings and by hinging the one tie down ring arranged in the one opening around the bolt portion at the support plate.

* * * * *